United States Patent Office 3,079,380
Patented Feb. 26, 1963

3,079,380
EXTRACTION OF A SUBSTANCE FROM DRY CITRUS MEAL WHICH INCREASES β-CAROTENE PRODUCTION BY *BLAKESLEA TRISPORA*
Alex Ciegler, George E. N. Nelson, and Harlow H. Hall, Peoria, Ill., assignors to the United States of America as represented by the Secretary of Agriculture
No Drawing. Original application Jan. 25, 1962, Ser. No. 168,849. Divided and this application May 21, 1962, Ser. No. 205,143
1 Claim. (Cl. 260—236.5)
(Granted under Title 35, U.S. Code (1952), sec. 266)

This application is a division of copending application Serial No. 168,849, filed January 25, 1962.

A nonexclusive, irrevocable, royalty-free license in the invention herein described, throughout the world for all purposes of the United States Government, with the power to grant sublicenses for such purposes, is hereby granted to the Government of the United States of America.

This invention relates to a method of greatly improving the production of beta-carotene by fermenting a culture of *Blakeslea trispora* in the presence of a hitherto unsuspected water-soluble principle extracted from citrus waste material.

More particularly this invention relates to the unobvious discovery that beta-ionone, the extremely high price of which presently accounts for over half of the total cost of microbiologically producing beta-carotene, may be substituted by an aqueous extract of extremely low-cost citrus peel waste material. The chemical nature of the water-soluble material is not known but chromatographic studies and its insolubility in organic solvents preclude its being preformed beta-carotene or a carotenoid-type compound.

The principal object of our invention is the discovery of an inexpensive material that can be substituted for beta-ionone in the microbiological production of beta-carotene.

Another object is the discovery of an improved fermentation medium for the production of beta-carotene.

Yet another object is a process for greatly increasing the yields of beta-carotene at a much lower cost than is presently known.

Other objects and advantages will become apparent in the following disclosure and appended claim.

In accordance with the objects of our invention we have now discovered that a beta-carotene promoting carotenoid-free aqueous extract of commercially available citrus meal (citrus peel waste that has been treated with alkali) can be prepared by extracting the dry commercial meal with certain organic solvents to remove all oil-soluble constituents including any carotenoids or carotenoid-like materials and then homogenizing the organic solvent-extracted meal in hot water to provide an aqueous extract. The crude solvent-extracted homogenate may be added to the fermentation medium as is, or the solids may be removed therefrom in any convenient manner and concentrated or water conveniently added to make 1 ml. represent 1 gm. of citrus meal.

In addition commercially available "citrus molasses" (obtained from whole citrus peel by treating the peel with alkali and then pressing out the aqueous molasses from the peel) and which is free of inherent carotenoids or carotenoid-like materials, may be substituted for the beta-ionone to obtain comparably increased yields of beta-carotene.

Solvent-extracted citrus peel aqueous homogenates (orange, tangerine, lemon, lime, grapefruit, or mixtures thereof) can be substituted for the beta-ionone with essentially similar results, but the unextracted whole peel or aqueous homogenate thereof is much less active because it also apparently contains an oil-soluble component that inhibits the fermentation.

We also determined that the addition of the fermentation broth of pre-formed beta-carotene did not improve the yield, said addition apparently not being metabolized so as to be protected from destruction by incorporation into the mycelia. Also, the addition of otherwise non-toxic solvents containing only the traces of carotene and xanthophyls present in the whole peel were apparently toxic to the organism inasmuch as beta-carotene production was greatly reduced.

The following examples and data typify the remarkably improved results of our invention.

EXAMPLE 1

100 g. of commercially obtained dry citrus meal was extracted with 600 ml. acetone in a Soxhlet apparatus until there was no further removal of pigment (about 3–4 hours). The acetone was discarded and the citrus solids in the extractor thimble were similarly extracted with 600 ml. of an equal mixture of pentane and hexane (B.P. 33–57° C.), and spread out to air dry. About 700–800 ml. of distilled water was then added to the solvent-extracted solids, the aqueous dispersion then being boiled for about 30 minutes. The solids were separated by filtration and repeatedly washed with 100 ml. aliquots of boiling water until the latter became quite clear. All of the aqueous portions were combined and then concentrated to 100 ml. by flash evaporation at 35° C., the resulting concentrate then being added to the fermentation in place of beta-ionone. Respectively 5 parts and 10 parts of our aqueous extract were added in respective 500 ml. conical flasks to 100 parts (100 ml.) of a fermentation medium having the following composition per 1000 ml:

| | |
|---|---|
| Commercial cottonseed germ meal_____gm____ | 50 |
| Corn meal _____gm____ | 23 |
| Cottonseed oil _____ml____ | 50 |
| "Deobase" (Sonneborn and Sons T.M. for deodorized kerosene as disclosed in application, S.N. 63,697, filed October 19, 1960, for "Microbiological Production of Carotene in a Medium Comprising Kerosene," now U.S. Patent No. 3,025,221_____ml____ | 50 |
| "Triton X–100," Rohm and Haas T.M. for octyl phenoxy decaethoxy ethanol_____ml____ | 1.2 |
| Thiamin-HCl _____gm____ | 0.002 |
| Tap water, q.s. ad 1000 ml. | |

The flasks then were plugged, sterilized, and cooled and each was then inoculated with 4 ml. of each of a 48 hr. stock culture of *Blakeslea trispora* NRRL 9216 and *Blakeslea trispora* NRRL 9159. The flasks were then agitated at 28° C. on a Gump shaker at 200 r.p.m. for 144 hours, the mycelia from each flask then being harvested by filtration, dried in a vacuum oven at 55° C., ground to a powder in a Wiley mill, dissolved in petroleum ether (B.P. 33–57° C.), and the solutions compared spectrophotometrically with an authentic beta-carotene sample in the same solvent. The yields compared with that of a control containing no citrus peel extract are shown in Table I.

Table I

| Extract added | Gms. Dry mycelia recovered per 100 ml. | Beta-carotene μg./100 ml. |
|---|---|---|
| None | 5.63 | 22,000 |
| 5 ml | 5.89 | 79,400 |
| 10 ml | 6.06 | 89,400 |

EXAMPLE 2

The fermentation of Example 1 was repeated with the exception that commercial citrus molasses was substituted for the aqueous extract of citrus meal. The results are shown in Table II.

*Table II*

| Citrus molasses added, percent by wt. | Gms. Dry mycelia recovered per 100 ml. | Beta-carotene μg./100 ml. |
|---|---|---|
| None | 5.76 | 54,800 |
| 2.5 | 7.21 | 113,700 |
| 5.0 | 8.87 | 101,100 |

Having disclosed our invention, we claim:

Method of preparing an extract that increases the production of beta-carotene by *Blakeslea trispora* comprising the steps of successively extracting commercial dry citrus meal with acetone and then with an equal mixture of pentane and hexane, removing the organic solvents, extracting the residue with successive portions of boiling water, pooling the aqueous portions, and concentrating the pooled aqueous extracts so that 1 ml. corresponds to 1 gm. of the dry citrus meal.

No references cited.